(No Model.)
J. J. ROBINSON.
VETERINARY TOOTH CUTTER.
No. 522,855. Patented July 10, 1894.
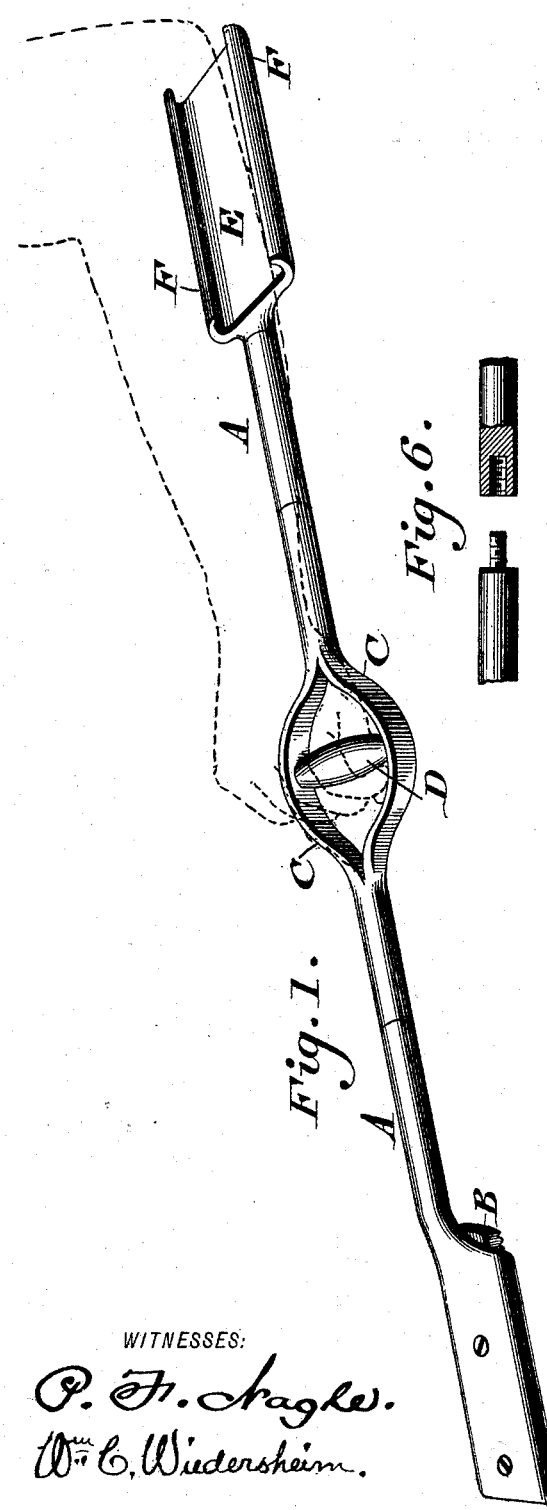
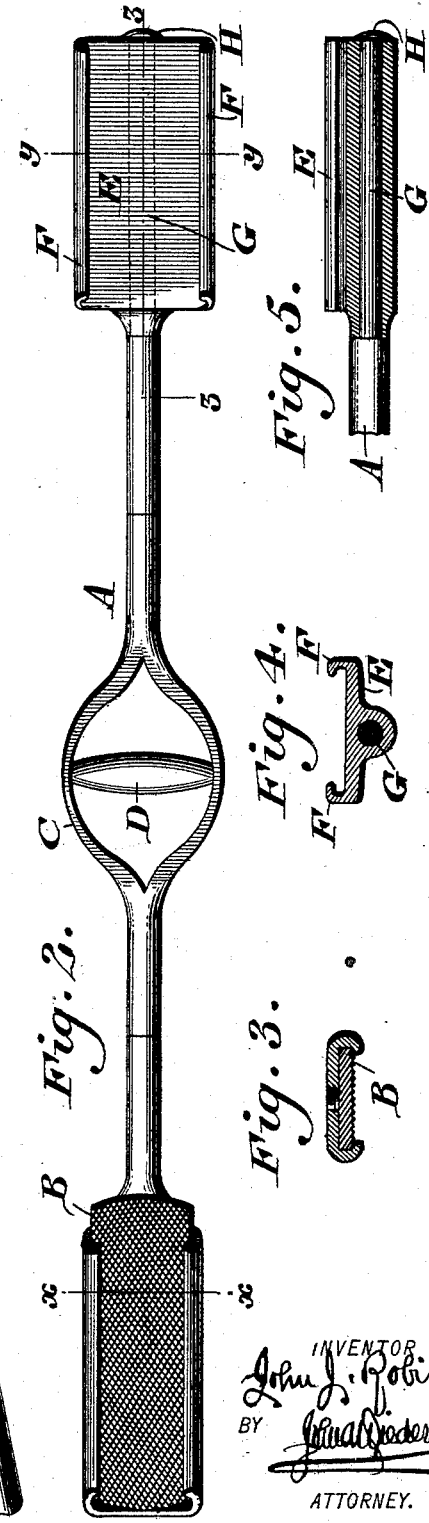
WITNESSES:
P. F. Nagle.
Wm. C. Wiedersheim.
INVENTOR
John J. Robinson.
BY
Wiedersheim
ATTORNEY.

UNITED STATES PATENT OFFICE.

JOHN J. ROBINSON, OF PHILADELPHIA, PENNSYLVANIA.

VETERINARY TOOTH-CUTTER.

SPECIFICATION forming part of Letters Patent No. 522,855, dated July 10, 1894.

Application filed December 30, 1893. Serial No. 495,193. (No model.)

*To all whom it may concern:*

Be it known that I, JOHN J. ROBINSON, a citizen of the United States, residing in the city and county of Philadelphia, State of Pennsylvania, have invented a new and useful Improvement in Veterinary Dental Floats for Filing or Otherwise Cutting Teeth, which improvement is fully set forth in the following specification and accompanying drawings.

My invention consists of a veterinary dental float, which is provided with a grip intermediate of its ends, whereby the instrument or float may be firmly grasped.

It also consists in providing the float with an arm-rest, whereby the power and effectiveness of the instrument may be increased.

It also consists in rendering the rest rotatable so as to be placed on the upper or lower side of the forearm of the operator.

Figure 1 represents a perspective view of a veterinary dental float embodying my invention. Fig. 2 represents a top or plan view thereof. Figs. 3 and 4 represent transverse sections on lines $x, x,$ and $y, y$, respectively, Fig. 2. Fig. 5 represents a longitudinal section on line $z, z$, Fig. 2. Fig. 6 represents a partial side elevation and partial section of a detached portion.

Similar letters of reference indicate corresponding parts in the several figures.

Referring to the drawings: A designates the shank of a veterinary dental float, and B designates the working part of the same. A portion of said shank is separated or bowed as at C, C, and to the same is secured the grip or handle D, which as is evident occupies a position intermediate of the ends of said shank.

On the end opposite to the part B, is an arm-rest E, whose sides are formed with flanges F, whereby the arm is prevented from slipping. The rest E is made rotatable, for which purpose it is axially mounted on the end portion or stem G, which projects from the shank A, and having its outer end headed or formed with a stop H, whereby the rest is prevented from displacement, it being noticed that the rest may be turned so that its flanged face may be placed on the upper or lower side of the forearm, in either of which positions, the grip or handle D may be grasped, and as the arm is braced on the rest E, the instrument may be operated in a powerful manner, held firmly to its work, and be effective in execution.

When the handle D is grasped, the bows C guard the hands of the operator, and also prevent the hand from slipping laterally.

The shank A is formed of screw-threaded sections for convenience of packing, carrying, &c.

Having thus described my invention, what I claim as new, and desire to secure by Letters Patent, is—

1. A veterinary dental float having a shank, and a handle on said shank intermediate of the ends thereof, substantially as described.

2. A veterinary dental float having a shank, bows on the shank intermediate of the ends thereof, and a handle connected with said bows, substantially as described.

3. A veterinary dental float having a shank and an arm rest thereon, substantially as described.

4. In a veterinary dental float, a shank having an arm-rest thereon, the same being rotatably mounted on said shank, substantially as described.

5. A veterinary dental float having a shank, an arm-rest at one end of said shank, and a handle between the opposite ends thereof, said parts being combined substantially as described.

JOHN J. ROBINSON.

Witnesses:
JOHN A. WIEDERSHEIM,
R. H. GRAESER.